US010397097B2

(12) United States Patent
Avci et al.

(10) Patent No.: US 10,397,097 B2
(45) Date of Patent: Aug. 27, 2019

(54) WEIGHTED NEXT HOP SELECTION AT A ROUTER USING AN EQUAL COST MULTIPATH PROCESS

(71) Applicant: Futurewei Technologies, Inc., Plano, TX (US)

(72) Inventors: Serhat Nazim Avci, Milpitas, CA (US); Zhenjiang Li, San Jose, CA (US); Fangping Liu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 184 days.

(21) Appl. No.: 15/409,484

(22) Filed: Jan. 18, 2017

(65) Prior Publication Data

US 2018/0205634 A1 Jul. 19, 2018

(51) Int. Cl.

| | |
|---|---|
| ***H04L 12/707*** | (2013.01) |
| ***H04L 12/803*** | (2013.01) |
| *H04L 12/741* | (2013.01) |
| *H04L 12/733* | (2013.01) |
| *H04L 12/721* | (2013.01) |

(52) U.S. Cl.

CPC ............ *H04L 45/24* (2013.01); *H04L 45/122* (2013.01); *H04L 45/124* (2013.01); *H04L 45/54* (2013.01); *H04L 47/125* (2013.01)

(58) Field of Classification Search

CPC ......... H04L 45/12; H04L 45/24; H04L 45/54; H04L 45/74; H04L 47/125

See application file for complete search history.

(56) References Cited

U.S. PATENT DOCUMENTS

| | | | | |
|---|---|---|---|---|
| 8,787,400 | B1 | 7/2014 | Barth et al. | |
| 2012/0158976 | A1* | 6/2012 | Van der Merwe | H04L 45/02 709/228 |
| 2014/0369186 | A1* | 12/2014 | Ernstrom | H04L 41/0668 370/228 |
| 2015/0124652 | A1* | 5/2015 | Dharmapurikar | G11C 15/04 370/255 |

(Continued)

OTHER PUBLICATIONS

Avci, Serhat Nazim, et al., "Congestion Aware Priority Flow Control in Data Center Networks," Futurewei Technologies, IFIP Networking, May 2016, 9 pages.

(Continued)

*Primary Examiner* — Michael Thier
*Assistant Examiner* — Brian P Cox
(74) *Attorney, Agent, or Firm* — Vierra Magen Marcus LLP

(57) ABSTRACT

A routing technique provides a routing table which assigns weights in the process of selecting a next hop at a router, while still using an equal cost multipath selection process at the router. The routing table is configured to cross reference an IP address prefix set to a number of next hops which can be all, or fewer than all, available next hops. This occurs in each row of the table for a different IP address prefix set. Subsets of the next hops are identified in each row in a manner which results in the next hops being selected according to specified weights. An estimate of traffic to the different IP address prefix set is also considered. The routing table can be configured based on announce and withdraw messages received from a link weight translator of a controller.

13 Claims, 14 Drawing Sheets

(56) References Cited

U.S. PATENT DOCUMENTS

| | | | | |
|---|---|---|---|---|
| 2015/0312137 A1* | 10/2015 | Li | H04L 12/6418 709/238 |
| 2015/0326476 A1* | 11/2015 | Ye | H04L 47/12 370/235 |
| 2016/0014025 A1* | 1/2016 | Wang | H04L 67/148 370/392 |
| 2017/0063600 A1* | 3/2017 | Singh | H04L 12/18 |
| 2017/0346727 A1* | 11/2017 | Perrett | H04L 45/126 |

OTHER PUBLICATIONS

Alizadeh, Mohammad, et al., "CONGA: Distributed Congestion-Aware Load Balancing for Datacenters," SIGCOMM, Aug. 2014, 12 pages.

Mohapatra, P., et al., "BGP Link Bandwidth Extended Community draft-ieft-idr-link-bandwidth-06.txt," Cisco Systems, Jan. 22, 2013, 7 pages.

Lapukhov, P.L., et al., "Using BGP for routing in large-scale data centers draft-lapukhov-bgp-routing-large-dc-04," Arista Networks, Apr. 8, 2013, 25 pages.

Ghorbani, Soudeh, et al., "Micro Load Balancing in Data Centers with DRILL," HotNets-XIV, Nov. 16-17, 2015, 7 pages.

Al-Fares, Mohammad, et al., "Hedera: Dynamic Flow Scheduling for Data Center Networks," In Proc. of Networked Systems Design and Implementation (NSDI) Symposium, Mar. 2010, 15 pages.

"BGP 4 Prefix Filter and Inbound Route Maps," IP Routing BGP Configuration Guide, Cisco IOS XE Release 3SE (Catalyst 3850 Switches), Sep. 2016, 16 pages.

Laurence, Shaly, et al., "SRAM Based Architecture for TCAM For Low Area and Less Power Consumption," APRN Journal of Engineering and Applied Sciences, vol. 10, No. 17, Sep. 2015, 6 pages.

"ECMP Load Balancing," MPLS: Layer 3 VPNs Configuration Guide, Cisco IOS XE Release 3S (Cisco ASR 900 Series), Jul. 2016, 12 pages.

"Multipath TCP," Internet Engineering Task Force (IETF), Dec. 2016, 5 pages.

He, Keqiang, et al., "Presto: Edge-based Load Balancing for Fast Datacenter Networks," SIGCOMM, Aug. 2015, 14 pages.

Zhou, Junlan, et al., "WCMP: Weighted Cost Multipathing for Improved Fairness in Data Centers," EuroSys '14 Proceedings of the Ninth European Conference on Computer Systems, No. 5, Apr. 2014, 13 pages.

Abouchaev, Adel, et al., "Brain-Slug: a BGP-Only SDN for Large-Scale Data-Centers," Microsoft, Jun. 2013, 29 pages.

Zhang, Junjie, et al., "Optimizing Network Performance using Weighted Multipath Routing," 21st International Conference onComputer Communications and Networks (ICCCN), Jul. 2012, 7 pages.

* cited by examiner

Fig. 4B

Table 400, Fractional weights for next hops

| | next hop 1 | next hop 2 | next hop 3 | next hop 4 | next hop 5 |
|---|---|---|---|---|---|
| All prefixes/ destination | w1 | w2 | w3 | w4 | w5 |

Weight mapping algorithm converts fractional weights for all prefixes into binary weights that apply to different sets of prefixes

Fig. 4C

Table 410, Binary weights for next hops

| Traffic estimate | Prefix set | next hop 1 | next hop 2 | next hop 3 | next hop 4 | next hop 5 |
|---|---|---|---|---|---|---|
| t1 | Prefix set 1 | f(1,1) | f(1,2) | f(1,3) | f(1,4) | f(1,5) |
| t2 | Prefix set 2 | f(2,1) | f(2,2) | f(2,3) | f(2,4) | f(2,5) |
| t3 | Prefix set 3 | f(3,1) | f(3,2) | f(3,3) | f(3,4) | f(3,5) |
| t4 | Prefix set 4 | f(4,1) | f(4,2) | f(4,3) | f(4,4) | f(4,5) |
| sum=1.0 | All prefixes/ destinatons | v1 | v2 | v3 | v4 | v5 |

Table 400a, Fractional weights for next hops

| | next hop 1 | next hop 2 | next hop 3 | next hop 4 | next hop 5 |
|---|---|---|---|---|---|
| All prefixes/ destination | 0.25 | 0.2 | 0.1 | 0.2 | 0.25 |

Fig. 4D

Weight mapping algorithm converts fractional weights for all prefixes into binary weights that apply to different sets of prefixes Table 410a, Binary weights for next hops

| Traffic estimate | Prefix set | next hop 1 | next hop 2 | next hop 3 | next hop 4 | next hop 5 |
|---|---|---|---|---|---|---|
| 0.2 | Prefix set 1 | 1 | 0 | 0 | 0 | 1 |
| 0.3 | Prefix set 2 | 1 | 1 | 0 | 1 | 1 |
| 0.15 | Prefix set 3 | 0 | 1 | 1 | 1 | 0 |
| 0.35 | Prefix set 4 | 1 | 1 | 1 | 1 | 1 |

Fig. 4E

Table 410b, Selection probabilities for next hops

| Traffic estimate | Prefix set | next hop 1 | next hop 2 | next hop 3 | next hop 4 | next hop 5 |
|---|---|---|---|---|---|---|
| 0.2 | Prefix set 1 | 0.5 | 0 | 0 | 0 | 0.5 |
| 0.3 | Prefix set 2 | 0.25 | 0.25 | 0 | 0.25 | 0.25 |
| 0.15 | Prefix set 3 | 0 | 0.33 | 0.33 | 0.33 | 0 |
| 0.35 | Prefix set 4 | 0.2 | 0.2 | 0.2 | 0.2 | 0.2 |
| sum=1.0 | All prefixes/ destinations | 0.245 | 0.1945 | 0.1195 | 0.1945 | 0.245 |

Fig. 4F $$v_j = \sum_{i=1}^{4} P(i, j) x t_i$$

$$v_j = \sum_{i=1}^{4} \frac{f(i,j)}{\sum_{j=1}^{5} f(i,j)} \times t_i \qquad f(i,j) \in (0,1)$$

$$\min \sum_{j=1}^{5} | w_j - v_j |$$

Fig. 5

Parameters $t_i, w_j$ $\forall i \in (1,m), \forall j \in (1,n)$ $C = \{c_1, c_2, c_3, \ldots c_T\}$ $c_k = [c_{k,1}\ c_{k,2} \ldots c_{k,n}]$ $\forall k \in (1,T), \sum_{j=1}^{n} c_{k,j} = 1$ Variables $m_{i,k}$ : 1 if subnet j chooses configuration k, 0 otherwise Objective function: $\min \sum_{j=1}^{n} | w_j - \sum_{i=1}^{m} t_i \sum_{k=1}^{T} m_{i,k} c_{k,j} |$ Constraints: $\sum_{k=1}^{T} m_{i,k} = 1 \quad \forall i \in (1,m)$ Once an optimum result is found, controller sends an announce message for all each prefix in set i for next hop j if $$m_{i,k} = 1 \quad and \quad c_{k,j} \geq 0$$

And the controller sends a withdraw message for the rest of the next hops – prefix configurations.

Objective function is normally sum of absolute values which is not directly implemented in linear programming.

$$\min \sum_{j=1}^{n} \left| w_j - \sum_{i=1}^{m} t_i \sum_{k=1}^{T} m_{i,k} c_{k,j} \right|$$

Instead, we introduce a set of extra variables $\delta_j$, $j \in (1, n)$ to represent the absolute value of each sum component.

Then we need two sets of constraints to make $\delta_j$ valid.

$$w_j - \sum_{i=1}^{m} t_i \sum_{k=1}^{T} m_{i,k} c_{k,j} \leq \delta_j \quad j \in (1, n)$$

$$-w_j + \sum_{i=1}^{m} t_i \sum_{k=1}^{T} m_{i,k} c_{k,j} \leq \delta_j \quad j \in (1, n)$$

Finally the objective function looks like: $\min \sum_{j=1}^{n} \delta_j$

Fig. 6C

For failure resiliency, there will be at least 2 next hops for each prefix set.

It is assumed that outgoing traffic is distributed to available (advertised) next hops homogenously.

Once the sets of prefixes for each next hop is calculated, these paths are injected using typical announce/withdraw BGP messages.

The algorithm can be formulated as a non-linear integer programming.

Objective function: $$\min \sum_{j=1}^{n} w_j - \sum_{i=1}^{m} \frac{f(i,j)}{\sum_{j=1}^{n} f(i,j)} \times t_i$$

Integer variables: $f(i,j) \in (0,1) \quad \forall i \in (1,m), \forall j \in (1,n)$ Parameters: $t_i, w_j \quad \forall i \in (1,m), \forall j \in (1,n)$ As a result, controller sends a withdraw message for all each prefix in set i for next hop j if f(i,j)=0, then it sends an announce message for each prefix in set i for next hop j if f(i,j)=1

Table 410a, Binary weights for next hops

| Traffic estimate | Prefix set | next hop 1 | next hop 2 | next hop 3 | next hop 4 | next hop 5 |
|---|---|---|---|---|---|---|
| 0.2 | Prefix set 1 | 1 | 0 | 0 | 0 | 1 |
| 0.3 | Prefix set 2 | 1 | 1 | 0 | 1 | 1 |
| 0.15 | Prefix set 3 | 0 | 1 | 1 | 1 | 0 |
| 0.35 | Prefix set 4 | 1 | 1 | 1 | 1 | 1 |

Enforcer submits BGP {…. announce: {next hop 1: {Prefix Set1, Prefix Set2, Prefix Set4}}, withdraw: {next hop 1: {Prefix Set3}}}.

Fig. 7A

Table 410a, Binary weights for next hops

| Traffic estimate | Prefix set | next hop 1 | next hop 2 | next hop 3 | next hop 4 | next hop 5 |
|---|---|---|---|---|---|---|
| 0.2 | Prefix set 1 | 1 | 0 | 0 | 0 | 1 |
| 0.3 | Prefix set 2 | 1 | 1 | 0 | 1 | 1 |
| 0.15 | Prefix set 3 | 0 | 1 | 1 | 1 | 0 |
| 0.35 | Prefix set 4 | 1 | 1 | 1 | 1 | 1 |

Enforcer submits BGP {…. announce: {next hop 2: {Prefix Set2, Prefix Set3, Prefix Set4}}, withdraw: {next hop 2: {Prefix Set1}}}.

Fig. 7B

Routing table 800 for Router 1

| Prefix set | Available next hops | |
|---|---|---|
| Prefix set 1 | next hop 1, next hop 5 | ← 801 |
| Prefix set 2 | next hop 1, next hop 2, next hop 4, next hop 5 | ← 802 |
| Prefix set 3 | next hop 2, next hop 3, next hop 4 | ← 803 |
| Prefix set 4 | next hop 1, next hop 2, next hop 3, next hop 4, next hop 5 | ← 804 |

Fig. 8

WEIGHTED NEXT HOP SELECTION AT A ROUTER USING AN EQUAL COST MULTIPATH PROCESS

BACKGROUND

Data centers support business, government and consumer users, among others, by storing and providing access to data. Typically, hundreds or thousands of servers are connected to one another to efficiently store and retrieve data. The servers are connected to a network such as the internet to provide data to user devices such as cell phones, laptops and personal computers or to other client devices. The servers are also connected to one another to exchange data. Routers allow packets of data to be communicated between the servers or other computing devices. A router typically can select from among multiple available links when communicating a packet.

BRIEF SUMMARY

In one embodiment, a router comprises a non-transitory memory storage comprising instructions and a routing table. The router also comprises one or more processors in communication with the memory, wherein the one or more processors execute the instructions to: receive a packet comprising an IP address prefix; access the routing table to identify a subset of a plurality of next hops, the subset is cross referenced by the IP address prefix, each of the plurality of next hops is connected to the router; selecting a next hop of the subset as a selected next hop based on an equal cost multiple path process, wherein at least two next hops in the subset are selected with different aggregate weights; and transmit the packet via the selected next hop.

In another embodiment, a computer-implemented method for routing data comprises, with one or more processors: assigning a weight to each next hop of a plurality of next hops connected to a router; based on the assigned weights, for each IP address prefix set of a plurality of IP address prefix sets, determining a subset of the next hops of the plurality of next hops which are to be cross referenced to the IP address prefix set; and providing instructions to the router for populating a routing table, wherein the instructions identify (a) for each next hop of the plurality of next hops, one or more IP address prefix sets which will cross reference the next hop, and (b) for at least one next hop of the plurality of next hops, one or more IP address prefix sets which will not cross reference the next hop.

In another embodiment, a non-transitory computer-readable medium storing computer instructions for routing data, that when executed by one or more processors, cause the one or more processors to perform the steps of: preparing announce instructions and withdraw instructions for a router which cause the router to provide weighted multipath load balancing using an equal cost multiple path process; and transmitting the announce instructions and the withdraw instructions to the router for populating a routing table.

In another embodiment, a computer-implemented method for routing data, comprises, with one or more processors: receiving instructions from a controller at a router, the instructions identify (a) for each next hop of a plurality of next hops of the router, one or more IP address prefix sets which will cross reference the next hop, and (b) for at least one next hop of the plurality of next hops, one or more IP address prefix sets which will not cross reference the next hop; translating the instructions to provide a weight for each next hop; and populating a routing table with the weights cross referenced to the next hops.

BRIEF DESCRIPTION OF THE DRAWINGS

Aspects of the present disclosure are illustrated by way of example and are not limited by the accompanying figures for which like references indicate elements.

FIG. 4B depicts a table showing the fractional weights assigned to different next hops of the router R1 of FIG. 4A.

FIG. 4C depicts a table obtained from converting the fractional weights of FIG. 4B to binary weights that apply to different sets of IP address prefixes (prefix set 1 to prefix set 4).

FIG. 4D shows a table 400*a* based on the table 400 of FIG. 4B with numerical examples for the fractional weights.

FIG. 4E shows a table 410*a* based on the table 410 of FIG. 4C with numerical examples for the binary weights based on the fractional weights of FIG. 4D and traffic estimates.

FIG. 4F depicts a table 410*b* based on the table 410*a* of FIG. 4E with equal probabilities assigned to the selected next hops in each row according to an equal cost multipath selection process.

FIG. 5 depicts mathematical expressions for the aggregate weights v_sub_j of FIG. 4C and for an objective function to minimize.

FIG. 6A depicts equations for implementing the weight mapping algorithm 330 of FIG. 3C.

FIG. 6B depicts further explanations of the weight mapping algorithm.

FIG. 6C depicts further explanations of the weight mapping algorithm.

FIG. 7A depicts how the enforcer prepares BGP announce and withdraw messages based on the binary weights for next hop 1 from the table 410*a* of FIG. 4E.

FIG. 7B depicts how the enforcer prepares BGP announce and withdraw messages based on the binary weights for next hop 2 from the table 410*a* of FIG. 4E.

FIG. 8 depicts an example routing table 800 consistent with the table 410*a* of FIG. 4E.

DETAILED DESCRIPTION

Figure 1A:
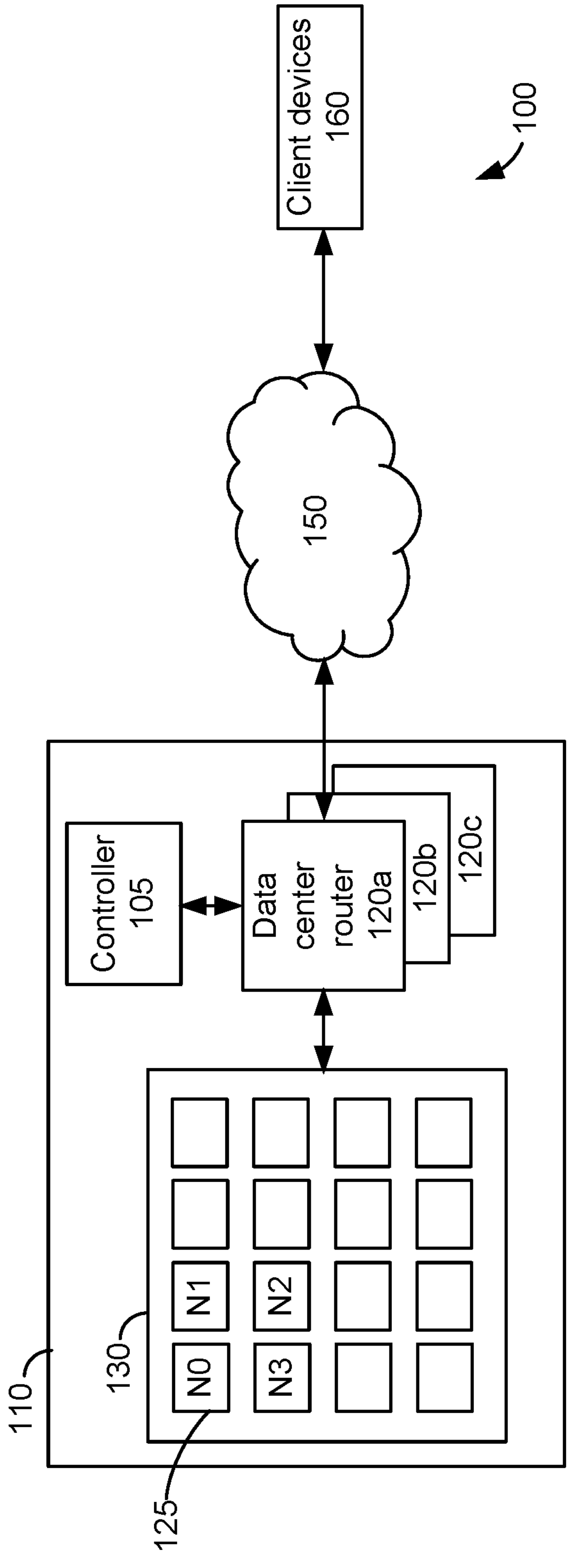
FIG. 1A depicts an example network including a data center.

The disclosure relates to devices and techniques for enabling a router to provide weighted multipath load balancing using an equal cost multiple path process.

Networks such as those in a data center are highly connected such that there are multiple paths which connect servers or other computing devices. The task of a router is to select one of multiple available next hops to route a packet which is received at the router. Typically, the router examines a destination address of the packet and identifies a number of next hop computing devices which can be used to transmit the packet to its destination. This is referred to as multipath routing since multiple paths are available to select from. In selecting a next hop, the router can consider a cost of each path. These paths can have equal or non-equal costs and the router can select the lowest cost path.

The cost of a path can be based on various metrics such as number of hops to the final destination (fewer hops are preferable), bandwidth (paths which have higher data transfer rates are preferable), delay (a smaller delay is preferable, where the delay is the amount of time it takes to communicate a packet to the final destination), reliability (a higher reliability is preferable, where the reliability is based on reported problems such as link failures, interface errors, and lost packets), and load (where a less congested path is preferable).

To provide low latency communications, multipath is critical to load balance over links in data center networks. In one approach, equal cost multipath (ECMP) routing is used in data center networks to distribute the network load between different servers. It is efficient in the aggregate. ECMP is a routing strategy where next hop packet forwarding to a single destination can occur over multiple best paths which tie for top place in routing metric calculations. Multi-path routing can be used with most routing protocols, because it is a per-hop decision limited to a single router. It can substantially increase bandwidth by load-balancing traffic over multiple paths.

ECMP can be used with routing protocols such as the Border Gateway Protocol (BGP). BGP is used to exchange routing information for the Internet and has become the de-facto control plane protocol for data center networks as well. However, ECMP as used with BGP does not allow certain paths to be favored or disfavored, e.g., weighted, without the use of proprietary extensions to BGP. Moreover, other approaches which may provide weight information can consume a substantial portion of the limited memory space in the router. In some cases, the memory space is provided using a Static Random Access Memory (SRAM) or Ternary Content Addressable Memory (TCAM) table.

Techniques provided herein address the above and other issues. In one aspect, weighted ECMP (WECMP) is proposed to adaptively adjust the preference of next hops based on the network dynamics. Weighted path selection is useful, e.g., for traffic engineering, link failure resiliency and preplanned maintenance or updates. For example, the preference of a path may change due to reliability issues, data drop off or congestion on the path.

A routing technique provides a routing table which results in next hops being selected according to desired aggregate weights at a router, while still using an equal cost multipath selection process at the router. The aggregate weight represents the weight with which a next hop is selected over a time period which involves multiple next hops selections. The routing table is configured to cross reference an IP address prefix set (representing a set of destination nodes) to a number of next hops which can be all, or fewer than all, available next hops. This occurs in each row of the table for a different IP address prefix set. See FIG. 8. Subsets of the next hops are identified in each row in a manner which results in the next hops being selected according to specified weights.

For example, the weight assigned to each next hop may be based on a number of rows in the routing table which cross reference an IP address prefix set to the next hop, a number of next hops in a row, and associated traffic estimates of the IP address prefix set.

The appropriate configuration of a routing table may be determined by an external controller based on the current network metrics. The controller transmits instructions to the router, such as announce and withdraw messages made according to the BGP protocol, to configure the routing table. If the network metrics change, the controller can re-configure the routing table. Moreover, a single controller may communicate with multiple routers to configure their routing tables.

Moreover, the weighted multipath techniques can be deployed without any extension of the BGP protocol and without significant consumption of memory resources in the router.

The techniques described herein may be used on any type of switching device, whether embodied in hardware and/or software. A router is discussed as one example of a switching device.

FIG. 1A depicts an example network 100 including a data center 110, a network 150 such as the internet and client computing devices 160 such as cell phones, laptops or personal computers. Another example of a client computing device is an analytic server which accesses the data center, such as to perform a big data analysis. The data center includes a number of nodes, such as example node 125, which are connected by a bus or backplane 130, for instance, to data center routers 120*a*, 120*b*, 120*c*, . . . . Each node comprises processing and memory resources. Example nodes are labeled N0, N1, N2 and N3. The bus or backplane, such as an optical backplane, is connected to each node to allow each node to communicate directly with the data center routers. The routers may be arranged to transfer data between the network 150 and the nodes, and between the nodes. Communication links can also be provided between the nodes. A controller 105 may be used to configure each router with a routing table, as discussed further below.

Figure 1B:
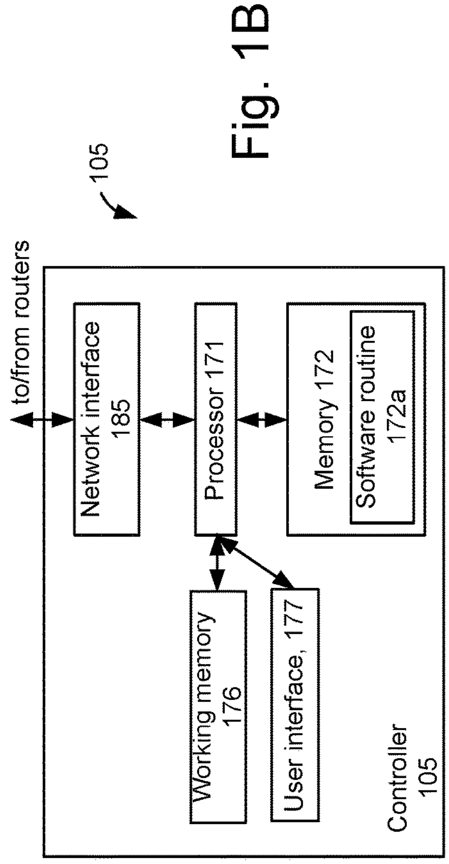
FIG. 1B depicts an example configuration of the controller 105 in the data center 110 of FIG. 1A.

FIG. 1B depicts an example configuration of the controller 105 in the data center 110 of FIG. 1A. The controller includes processing and data storage capabilities including a processor 171, a primary memory 172 comprising a software routine 172*a*, a working memory 176, a user interface 177 and a network interface 185. The processor may include a microprocessor or other implementation of a processing unit. The processor may load and execute code (e.g., the software routine) in the working memory to carry out the functions of the controller as described herein. The memory 172 may also store an address of the controller 105 such as an Internet Protocol (IP) address and/or Media Access Control (MAC) address which the controller uses in communicating with the routers. The user interface may be used by a user to input commands to the controller and to monitor data of the controller such as network metrics and weights assigned to the next hops of the routers.

The network interface allows the controller to communicate with the data center routers. The network interface may communicate using the Ethernet standard, for example. Ethernet is a local area network (LAN) technology which describes how networked devices can format data for transmission to other network devices. Ethernet transmissions use a packet which includes a header and a payload. The header includes information such as a Media Access Control (MAC) destination address and source address, in addition to error-checking data. The network interface may be a network interface controller card comprising ports. Communication cables, such as CATS cables, may plug into the physical ports.

The memory 172 may be non-volatile storage for software (code) which is loaded into the working memory 176 and executed by the processor 171 to perform the functions described herein. The working memory may be a volatile memory, e.g., RAM.

Figure 1C:
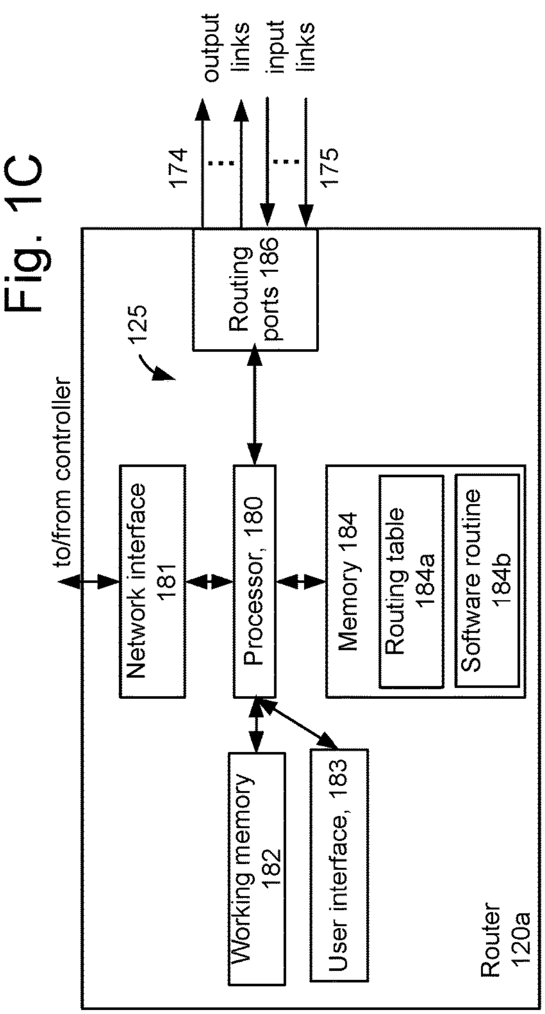
FIG. 1C depicts an example configuration of the router 120*a* in the data center 110 of FIG. 1A.

FIG. 1C depicts an example configuration of the router 120*a* in the data center 110 of FIG. 1A. The router may include a processor 180, a primary memory 184 comprising a routing table 184*a* and a software routine 184*b*, a working memory 182, a user interface 183 and routing ports 186. The routing ports are connected to output links 174 and input links 175. Examples of a routing table are provided further below. The processor may include a microprocessor or other implementation of a central processing unit. The processor may load and execute code (e.g., the software routine) in the working memory to carry out the functions of the router as described herein. The memory 184 may store an address of the router such as an IP or MAC address. The user interface may be used by a user to input commands to the router and to monitor data of the router such as the routing table. The network interface 181 allows the router to communicate with the controller and with other routers or destination nodes. The network interface 185 may connect to the bus or backplane 130, for instance.

The memory 184 may be non-volatile storage for software (code) which is loaded into the working memory 182 and executed by the processor 180 to perform the functions described herein. The working memory may be a volatile memory, e.g., RAM.

In FIGS. 1B and 1C, the memories and working memories may comprise computer-readable non-transitory media. Such media can include all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Various computing devices may utilize all of the components shown, or only a subset of the components, and levels of integration may vary from device to device. Furthermore, a device may contain multiple instances of a component, such as multiple processing units, processors, memories, transmitters, receivers, etc. The data source may comprise a hardware storage device which stores samples of data which are to be processed. The processors may be any type of electronic data processor such as a CPU. The input/output devices may include network interfaces, storage interfaces, monitors, keyboards, pointing devices and the like. A working memory may store code, e.g., instructions which are executed by a processor to carry out the functions described herein. The code may be stored in a non-volatile memory and loaded into the working memory.

The memory/storage devices may comprise any type of system memory such as static random access memory (SRAM), dynamic random access memory (DRAM), synchronous DRAM (SDRAM), read-only memory (ROM), a solid state drive, hard disk drive, a magnetic disk drive, or an optical disk drive. The memory devices may include ROM for use at boot-up, and DRAM for program and data storage for use while executing programs. The memory devices may include non-transitory, hardware memory devices.

Figure 2:
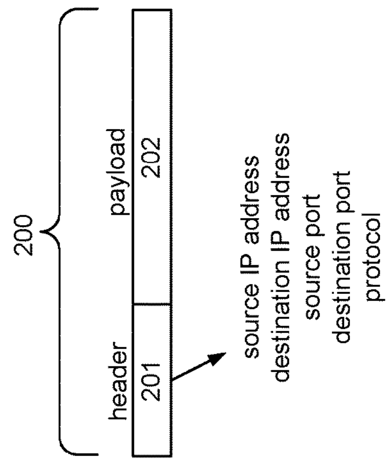
FIG. 2 depicts an example packet of data, according to an embodiment.

FIG. 2 depicts an example packet of data, according to an embodiment. An example packet may be provided according to the Ethernet format, for instance. The packet 200 includes a header 201 and a payload 202. The header can include data such as a source IP address, a destination IP address, a source port identifier, a destination port identifier and a protocol identifier. This information can be used for routing over the IP layer.

Figure 3A:
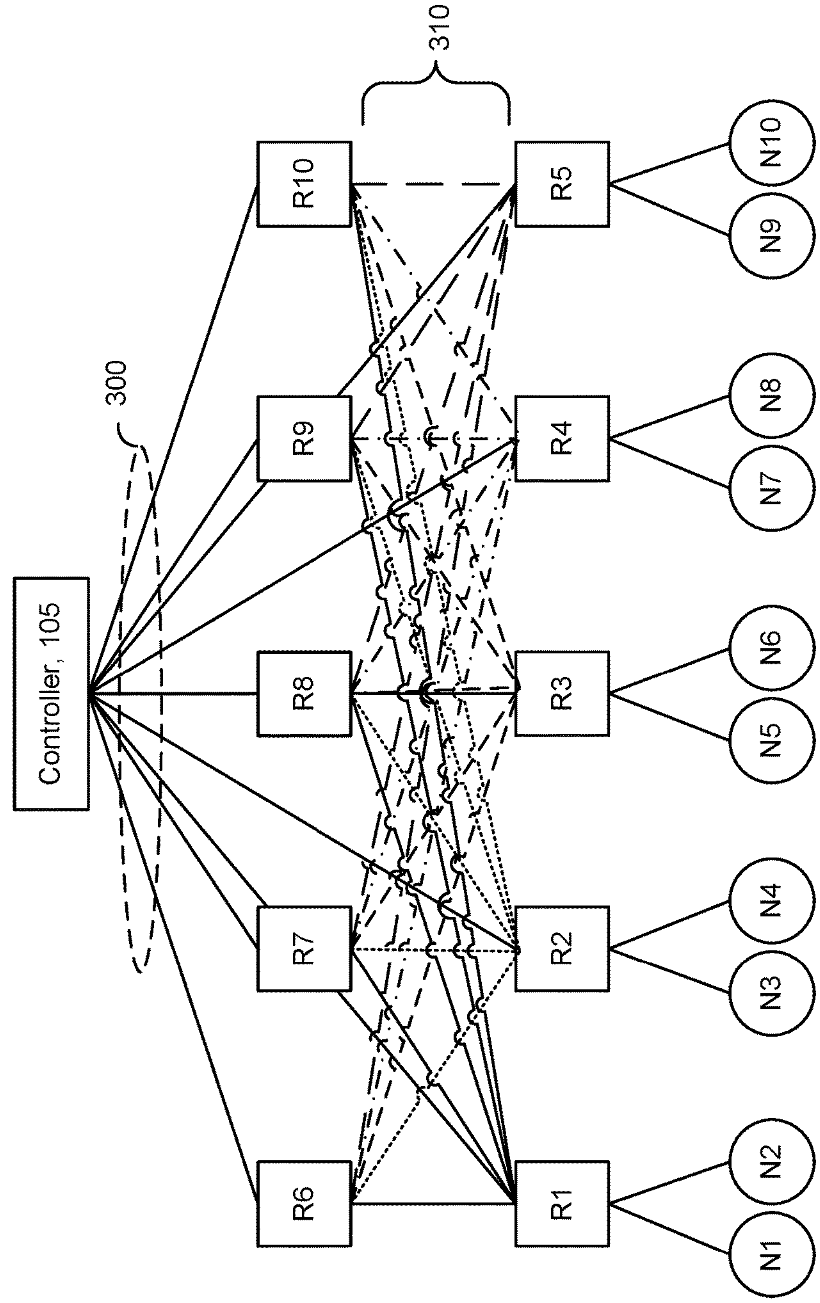
FIG. 3A depicts a network in which a controller 105 communicates with routers using Border Gateway Protocol (BGP) connections.

FIG. 3A depicts a network in which a controller 105 communicates with routers R1-R10 using Border Gateway Protocol (BGP) connections. The routers R1-R5 are also depicted as communicating with endpoint computing devices such as computing nodes N1-N10. These devices may be destination nodes for data packets. Each router can communicate with the controller via BGP connections 300, for instance, while the routers can communicate with each other via links 310. In this example, each router has five links connected to it and five corresponding next hops. In a series of routers that are connected together in a network, a next hop is a next possible destination (e.g., router or endpoint computing device) for a packet. The available next hops of a router are identified by respective IP address entries in a routing table. For example, for R1, the next hops are R6-R10.

In this configuration, the controller cannot configure the routers with assigned weights for different links/next hops without the disadvantages mentioned previously, including use of proprietary BGP extensions or excessive memory consumption.

Figure 3B:
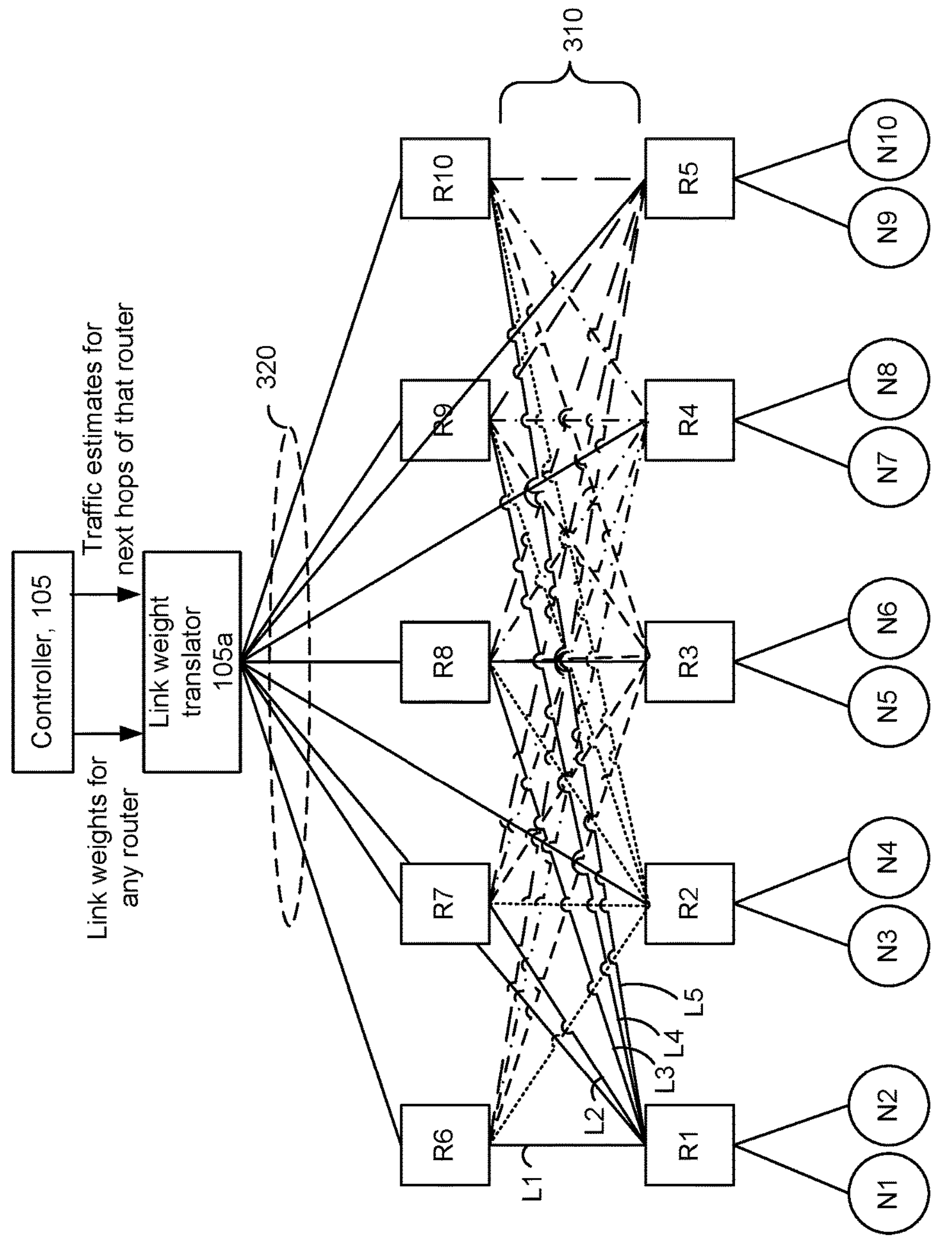
FIG. 3B depicts a network in which a controller 105 comprises a link weight translator 105*a* which communicates with routers to configure the routers with different weights for different links/next hops.

FIG. 3B depicts a network in which a controller 105 comprises a link weight translator 105*a* which communicates with routers to configure the routers to route data with different weights for different links/next hops without the disadvantages mentioned previously. The communications can be made over BGP connections using announce and withdraw messages 320, in one possible embodiment. The link weight translator (LWT) can be part of the controller such as a module in the controller, for instance, but is depicted separately for clarity. The LWT enables implicit weighted multipath load balancing and can be readily used to configure routers including those using the BGP protocol. The LWT implements a mapping algorithm which converts desired fractional weights for all next hops of a router into a partial set of IP address prefix sets for each next hop of the router. This algorithm can be employed in a centralized controller by inputting desired weights and traffic estimates for an IP address prefix set. The desired, optimum weights can be obtained using existing techniques. The controller inject routes on a given router using BGP that will override routes which the given router has learned from other routers.

For example, the router R1 has outgoing links L1-L5. The controller may determine that L1 is becoming congested based on monitoring of an amount of traffic on that link. For example, the monitoring may indicate that an amount of traffic exceeds a threshold level. In response to the monitoring, the controller can decide to lower a weight assigned to the link, where the router selects a link with a probability which is equal to its weight. For example, the weight may be reduced from 0.2 to 0.1.

In one aspect, the controller inputs weights and traffic estimates, translates the weights, uses BGP announce and withdraw commands to override and modify routing behavior, and requires the routers to perform ECMP. In one embodiment, the controller does not calculate weights but instead uses weights that are already available from a router monitoring process. Or, it is possible for the controller to also calculate the desired weights. The controller may not calculate traffic estimates but instead use traffic estimates that are already available from a router monitoring process. Or, it is possible for the controller to also calculate the traffic estimates. The controller need not modify the BGP which is used on the routers, or require the routers to perform local computations or perform a weighted multipath selection process. The techniques described herein can therefore be easily be deployed with existing routers without imposing additional burdens on the routers. Moreover, the techniques can be deployed from a centralized controller which communicates with many routers.

Figure 3C:
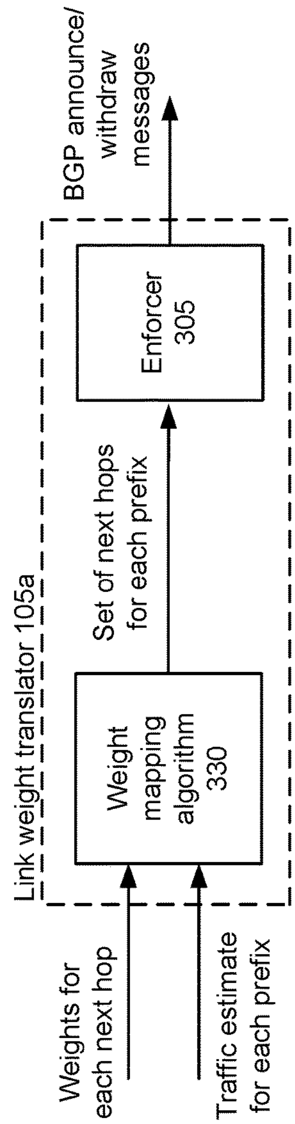
FIG. 3C depicts example details of the link weight translator 105*a* of FIG. 3B.

FIG. 3C depicts example details of the link weight translator 105*a* of FIG. 3B. The LWT includes two software modules. In a first module, a weight mapping algorithm 330 receives desired weights for each next hop of a router, and a traffic estimate for each IP address prefix set of the router. In response to these inputs, the LWT calculates a set of next hops for each IP address prefix set. In a second module, an enforcer algorithm 305 inputs the set of next hops for each prefix set of the router and enforces a corresponding prefix-to-next hop mapping in a routing table of the router. The enforcer submits BGP announce and withdraw messages to advertise only the selected next hops to a router. The router updates its routing table in response to the messages and overrides a previously configured behavior of the router.

Figure 4A:
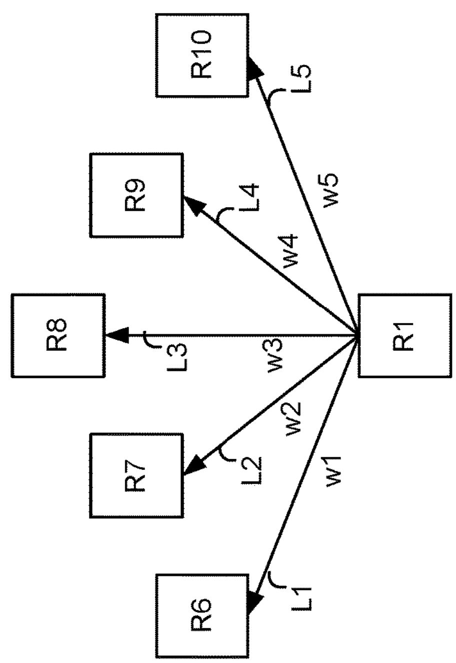
FIG. 4A depicts router R1 of FIG. 3A and its links L1-L5 which have respective assigned weights w1-w5, for communications to routers R6-R10, respectively.

FIG. 4A depicts router R1 of FIG. 3A and its links L1-L5 which have respective assigned weights w1-w5, for communications to routers R6-R10, respectively. The links may represent communication paths from R1 to the other routers. The communication paths can be electrical, optical, wired and/or wireless, for instance.

FIG. 4B depicts a table 400 showing the fractional weights assigned to different next hops of the router R1 of FIG. 4A. The routers R6-R10 represent the next hops1-5, respectively. The table indicates that weights w1-w5 are assigned to the next hops1-5, respectively. These next hops are used to communicate data to all destinations/IP address prefixes. The weights are fractional weights, e.g., decimal numbers between 0 and 1. See FIG. 4D for examples.

FIG. 4C depicts a table 410 obtained from converting the fractional weights of FIG. 4B to binary weights that apply to different sets of IP address prefixes (prefix sets 1-4). There are four prefix sets and five next hops (next hops1-5), as an example. The weight mapping algorithm converts the fractional weights for all prefixes into binary weights (e.g., 0 or 1) that apply to different sets of prefixes. The binary weights are represented by f(1,1)-f(1,5) for prefix set 1, f(2,1)-f(2,5) for prefix set 2, f(3,1)-f(3,5) for prefix set 3 and f(4,1)-f(4,5) for prefix set 4. The variable f(i,j) represents binary values/weights (e.g., 0 or 1) in a table where i is a row index and j is a column index. The table also includes traffic estimates t1-t4 of an amount of traffic which the router will transmit to destination devices associated with prefix sets 1-4, respectively. The traffic estimates can be expressed as decimal values between 0 and 1 and sum to 1. A traffic estimate for a given prefix set is a portion of all traffic sent by the router which will be sent to destinations associated with the given prefix set. See FIG. 4E for examples.

The last row of the table notes that the traffic estimates sum to 1.0. Also, aggregate weights v1-v5 for all prefixes/destinations are achieved for the next hops 1-5, respectively, based on the binary weights. The aggregate weight of a next hop represents the weight with which the next hop is selected to route data over a period of time involving multiple next hop selections.

IP address prefixes are patterns which match the first n binary bits of an IP address. The standard syntax is to write the prefix bits that must match in dotted-quad format, followed by a slash and then the number of bits in the prefix. Any trailing bits, not part of the prefix, are written as zero. If an entire trailing byte is zero, it can be written explicitly, as in the example prefix "128.8.0.0/16," or omitted, as in the example prefix "128.8/16." Since only the first sixteen bits are significant (in this example), the remaining sixteen bits can be omitted. One or more destination nodes or computing devices can be associated with an IP address prefix.

Example routing tables provided herein discuss four IP address prefix sets referred to as prefix set 1, prefix set 2, prefix set 3 and prefix set 4. Each prefix set represents one or more IP address prefixes. The term "set" thus includes a unit set in the case of one IP address prefix in the set. A single IP address prefix represents a continuous set of IP addresses. The set also encompasses a group of multiple IP address prefixes. For example, one example of an IP address prefix is 128.10.0.0/16 and another example of an IP address prefix is 234.56.0.0/16. An example of a prefix set comprises both of these IP address prefixes. For instance, in FIG. 3A, the nodes N3 and N4 may comprise computing devices having IP addresses associated with the IP address prefixes 128.10.0.0/16 and 234.56.0.0/16, respectively. The router R2 can be configured with these IP address prefixes to route data to these nodes. Further, an IP address prefix represents a subnet.

FIG. 4D shows a table 400*a* based on the table 400 of FIG. 4B with numerical examples for the fractional weights. The table indicates that weights 0.25, 0.2, 0.1, 0.2 and 0.25 are assigned to the next hops1-5, respectively. These are desired weights which are to be assigned to next hops of a router. As mentioned, when communicating data, the router selects a link or next hop with a probability which is equal to its aggregate weight. Thus, for example, there is a 25% probability that the router will select next hop 1. The aggregate weight is achieved by providing binary weights for each prefix set.

FIG. 4E shows a table 410*a* based on the table 410 of FIG. 4C with numerical examples for the binary weights based on the fractional weights of FIG. 4D and traffic estimates.

The binary weights are 1, 0, 0, 0 and 1 for next hops 1-5, respectively, with destinations of prefix set 1. The binary weights are 1, 1, 0, 1 and 1 for next hops 1-5, respectively, with destinations of prefix set 2. The binary weights are 0, 1, 1, 1, 0 for next hops 1-5, respectively, with destinations of prefix set 3. The binary weights are 1, 1, 1, 1 and 1 for next hops 1-5, respectively, with destinations of prefix set 4. In one approach, each weight of "1" in a row indicates the corresponding next hop can be used to communicate data to a destination of the prefix set identified in the row. Each weight of "0" in a row indicates the corresponding next hop cannot be used to communicate data to a destination of the prefix set identified in the row. For example, next hops 1 and 5 can be used for prefix set 1, next hops 1, 2, 4 and 5 can be used for prefix set 2, next hops 2, 3 and 4 can be used for prefix set 3, and next hops 1-5 can be used for prefix set 4.

Each row can include two or more 1's so that there are at least two next hops for failure resiliency. That is, if the link for one next hop fails, the router can communicate via the other next hop. A row can include all 1's as well as indicated for prefix set 4. It is also possible for different rows to include the same number of 1's but generally there will be different sets of binary weights in different rows.

Traffic estimates of 0.2, 0.3, 0.15 and 0.35 are also provided for prefix sets 1-4, respectively. As an example, 0.2 means 20% of the total traffic through the router is destined for the destinations in prefix set 1. 100% of the traffic destined for prefix set 1 is sent via next hops 1 and 5. Further, when the router uses ECMP, this traffic is divided equally among these next hops, e.g., 10% for next hop 1 and 10% for next hop 5. Therefore, 10% of the total traffic through the router is sent via next hop 1 and 10% is sent via next hop 5. Generally, when a row has more 1's, there is relatively less traffic for each next hop for destinations of the associated prefix set. That is, the traffic is spread out among relatively more next hops. A larger number of 1's in a row also corresponds to a smaller fractional weight for each selected next hop in the row. As mentioned, the traffic estimates can be based on observations of traffic at a router over time.

FIG. 4F depicts a table 410*b* based on the table 410*a* of FIG. 4E with equal probabilities assigned to the selected next hops in each row according to an equal cost multipath selection process. As mentioned, with the ECMP process, the router selects one of the selected next hops for a given prefix set with equal probability. Thus, in a row of the table associated with a given prefix set, the router selects one of the next hops for which there is a binary weight of 1 with equal probability. In the row for prefix set 1, the two selected next hops each receive one-half (0.5) of the associated traffic. In the row for prefix set 2, the four selected next hops each receive one-fourth (0.25) of the associated traffic. In the row for prefix set 3, the three selected next hops each receive one-third (0.33) of the associated traffic. In the row for prefix set 4, the five selected next hops each receive one-fifth (0.2) of the associated traffic.

Thus, when the destination is associated with prefix set 1, 2, 3 or 4, the probability that the router selects a given one of the next hops associated with the prefix set is 0.5, 0.25, 0.33 or 0.2, respectively.

The last row of the table indicates that the traffic estimates sum to 1. Also, a fractional aggregate weight which is achieved based on the binary weights and the traffic estimates is indicated. The achieved weights of 0.245, 0.1945, 0.1195, 0.1945 and 0.245 are very close to the desired weights of 0.25, 0.2, 0.1, 0.2 and 0.25, respectively, of FIG. 4D. Based on an aggregate amount of traffic, the weights achieved by the tables of FIGS. 4D and 4F are essentially equal. The achieved weights generally will converge to the desired weights.

Mathematical calculations can be used to set the binary weights which will achieve the desired aggregate weight for each next hop.

The table of FIG. 4F is not necessarily generated at the controller or the router but indicates how the router selects one next hop among a subset of available next hops with equal probability, given a particular prefix set. The routing table of FIG. 8 achieves this result.

FIG. 5 depicts mathematical expressions for the aggregate weights v_sub_j of FIG. 4C and for an objective function to minimize. In the first expression, each aggregate weight of a jth next hop is denoted by v_sub_j and can be expressed in terms of a summation of a product of probabilities P(i,j) and traffic estimates t_sub_i. The traffic estimate of an ith row is denoted by t_sub_i. For example, in FIG. 4F, for next hop 1, the aggregate weight v_sub_1 is $0.2\times0.5+0.3\times0.25+0.35\times0.2=0.1+0.075+0.07=0.245$. The probability can be described by the second expression in FIG. 5A in which P(i,j) is related to the binary weights f(i,j). The formula for v_sub_j involves a summation over each ith row. For each ith row, there is a summation over each jth column. The third expression provides an objective function which is to minimize the absolute value of the difference between w_sub_j and v_sub_j over the different values of j (e.g., over the different columns of the table 410). Each desired weight of a jth next hop is denoted by w_sub_j.

The algorithm can be optimally formulated using linear integer programming, as discussed further below. For failure resiliency, there will be at least two next hops for each prefix set. It is assumed that outgoing traffic is distributed to available (advertised) next hops homogenously (e.g., using ECMP). Once the set of prefixes for each next hop is calculated, these paths are injected into the routers using announce/withdraw BGP messages, for instance.

First, a set of partial advertisement configurations is listed. For example, if we want to advertise next hops 2 and 3 only (assuming next hops 1-5 are available), the configuration would be c=[0 0.5 0.5 0 0], whose total sum would be 1 and non-zero elements would be more than 1 and equal. If we want to advertise next hops 1, 4 and 5, then the configuration would be c=[0.333 0 0 0.333 0.333]. The full set of configuration are listed as parameters in set C which has a size of T. Then we create one variable for each configuration.

FIG. 6A depicts equations for implementing the weight mapping algorithm 330 of FIG. 3C. The parameters include the traffic estimates t_sub_i and the desired next hop weights w_sub_j, with i being an integer ranging from 1 to m and j being an integer ranging from 1 to n. The parameters also include the configuration values. A variable m_sub_i,k has a value of 1 if the IP address prefix chooses a configuration k or 0 otherwise (the IP address prefix does not choose the configuration k). The objective function and constraints are also depicted. Once an optimum result is found, the controller sends announce and withdraw messages to a router.

FIG. 6B depicts further explanations of the weight mapping algorithm. Regarding the objective function of FIG. 6A, it comprises a sum of absolute values which is not directly implemented in linear programming. Instead, we can introduce a set of extra variables δ_sub_j to represent the absolute value of each sum component. Then, we have two sets of constraints to make δ_sub_j valid. Finally, an objective function involves minimizing a sum over j of δ_sub_j.

FIG. 6C depicts further explanations of the weight mapping algorithm. As noted, for failure resiliency, there can be at least two next hops for each prefix set. It is assumed that outgoing traffic is distributed to available (advertised) next hops homogenously (e.g., with equal probability). Once the set of prefixes for each next hop is calculated, these paths are injected using announce/withdraw messages. The algorithm can be formulated as a non-linear integer programming. As a result, controller sends a withdraw message for each prefix in set i for next hop j if f(i,j)=0, and it sends an announce message for each prefix in set i for next hop j if f(i,j)=1.

FIG. 7A depicts how the enforcer prepares BGP announce and withdraw messages based on the binary weights for next hop 1 from the table 410*a* of FIG. 4E. As mentioned, a binary 1 or 0 is placed in a column to select or unselect, respectively, the corresponding next hop. This is done for each prefix set at the enforcer module. The enforcer module inputs the results of the weight mapping as a matrix of prefixes and next hops for a router. The enforcer can transmit a message to the router for each next hop to indicate what prefix sets it is to be associated with and not associated with. For example, for the highlighted column corresponding to next hop 1, the enforcer can submit a BGP message of the format: { . . . announce: {next hop 1: {Prefix Set1, Prefix Set2, Prefix Set4}}, withdraw: {next hop 1: {Prefix Set3}}}. The "announce" term indicates that next hop 1 is to be associated with prefix sets 1, 2 and 4. The "withdraw" term indicates that next hop 1 is not to be associated with prefix set 3.

FIG. 7B depicts how the enforcer prepares BGP announce and withdraw messages based on the binary weights for next hop 2 from the table 410*a* of FIG. 4E. For the highlighted column corresponding to next hop 2, the enforcer can submit a BGP message of the format: { . . . announce: {next hop 2: {Prefix Set2, Prefix Set3, Prefix Set4}}, withdraw: {next-hop 2: {Prefix Set1}}}. The "announce" term indicates that next hop 2 is to be associated with prefix sets 2, 3 and 4. The "withdraw" term indicates that next hop 2 is not to be associated with prefix set 1.

Announce and withdraw messages can similarly be provided for the remaining next hops. Note that it is possible that a withdraw message is not provided for a particular next hop if that next hops is cross referenced in each row of the routing table to a prefix set.

FIG. 8 depicts an example routing table 800 consistent with the table 410*a* of FIG. FIG. 4E. The routing table is configured by messages sent to the router from the controller, in one approach. The router processes the messages and populates its routing table accordingly, e.g., by storing an identifier of a prefix set and identifiers of selected next hops in each row. The routing table informs the router of a subset of next hops to select from in routing packets.

For example, if a packet is received with a destination address which indicates it is associated with prefix set 1, the router will select from among next hops 1 and 5 in routing the packet. The selection can be made among the advertised next hops using an ECMP process.

Each row of the table comprises identifiers of a subset of next hops among a plurality of next hops connected to a router. The subset can include all, or fewer than all, of the plurality of next hops. For example, the subset 804 includes all of the plurality of next hops, e.g., next hops 1-5. Further, the rows of the routing table can comprise overlapping and non-overlapping subsets of next hops. For example, the subset 801 of next hop 1 and 5 overlaps with the subset 802 of next hop 1, 2, 4 and 5 but not with the subset 803 of next hop 2, 3 and 4. Generally, at least two next hops are selected with different aggregate weights. It is also possible for all next hops to be selected with different aggregate weights.

Figure 9C:
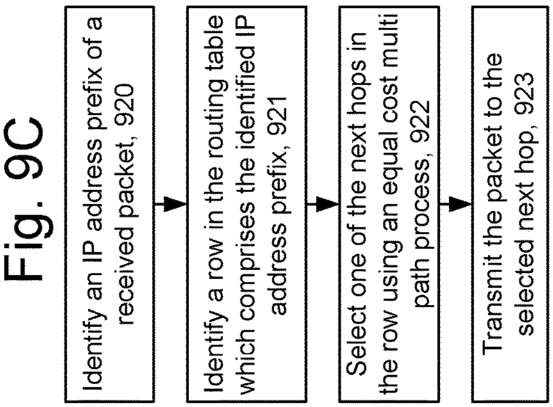
FIG. 9C depicts an example process at a router for routing packets using a routing table, consistent with FIG. 9B.
Figure 9B:
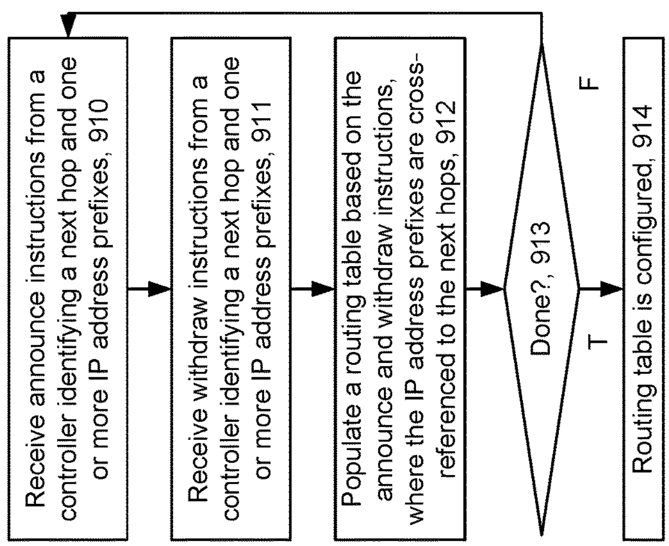
FIG. 9B depicts an example process at a router for configuring a routing table, where the router uses an equal cost multipath (ECMP) process to select next hops with different weights.
Figure 9A:
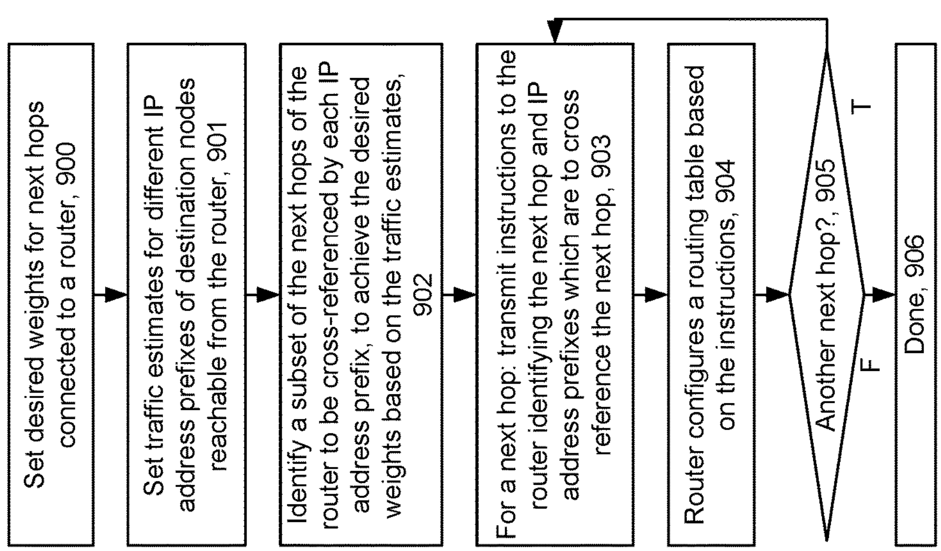
FIG. 9A depicts an example process at a controller for configuring a routing table.

FIG. 9A depicts an example process at a controller for configuring a routing table. Step 900 includes setting desired weights for next hops connected to a router. See, e.g., FIG. 4B and the weights w1-w5. Step 901 includes setting traffic estimates for different IP address prefix sets for destination nodes which are reachable from the router. See, e.g., FIG. 4C and traffic estimates t1-t4. Step 902 includes identifying a subset of the next hops of the router to be cross referenced by each IP address prefix set, to achieve the desired weights based on the traffic estimates. For example, FIG. 4E shows that the subset includes next hop 1 and 5 for prefix set 1, among a set of next hops which includes next hops 1-5. The term "subset" may represent all next hops in a set of next hops, or fewer than all next hops in the set. The term "strict subset" or "proper subset" may represent fewer than all next hops in the set, but not all next hops in the set. The weight mapping algorithm of FIG. 6A-6C may be used in this step.

At step 903, for a next hop of the router, the controller transmits instructions to the router identifying the next hop and IP address prefix sets which are to cross reference the next hop. See, e.g., FIGS. 7A, 7B and 8 and the example announce and withdraw messages. At step 904, a router configures a routing table based on the instructions. See, e.g., FIG. 8. A decision step 905 determines if there is another next hop of the router to configure. If the decision step is false, the process is done at step 906. If the decision step is true, steps 903 and 904 are repeated for another next hop.

FIG. 9B depicts an example process at a router for configuring a routing table, where the router uses an equal cost multipath (ECMP) process to select next hops with different weights. Step 910 includes receiving announce instructions from a controller identifying a next hop and one or more IP address prefix sets. Step 911 includes receiving withdraw instructions from a controller identifying a next hop and one or more IP address prefix sets. Step 912 includes populating a routing table based on the announce and withdraw instructions, where the IP address prefixes are cross referenced to the next hops. A decision step 913 determines if the process is done, e.g., there are no further announce and withdraw messages. If decision step 913 is true, the routing table is configured at step 914. If decision step 913 is false, steps 910 and 911 are repeated.

Note that the assigned weights of the next hops can change over time so that the routing table can be periodically reconfigured. In the initial configuring of the table, the withdraw messages may not be required since identifiers of next hops are not being removed from rows of the routing table. In subsequent reconfiguring, the withdraw message can be used to remove an identifier of a next hop from a row of the routing table.

FIG. 9C depicts an example process at a router for routing packets using a routing table, consistent with FIG. 9B. In this process, the routing table has already been configured. Step 920 includes identifying an IP address prefix of a received packet. In one approach, the IP address prefix comprises a portion of an Internet Protocol (IP) destination address in a header of the packet. Step 921 includes identifying a row in the routing table which comprises the identified IP address prefix. Step 922 includes selecting one of the next hops in the row using an equal cost multipath selection process. Step 923 includes transmitting the packet to the selected next hop. Note that a set of packets which are being transmitted from the same sender to the same destination can be sent via the same next hop. This avoids splitting up related packets over different hops which can result in the packets arriving at the destination in a non-sequential order.

The techniques disclosed herein provide various benefits. For example, the techniques enable a weighted load balancing implementation using BGP without any extensions. The techniques overcome limitations of proprietary weighted load balancing processes and empower network designers to customize the process to meet their needs. Further, the techniques do not inflate the size of routing tables such as embodied by SRAM/TCAM tables.

A mapping algorithm converts fractional weights for each next-op for all prefixes into partial prefixes for each next hop. These partial advertisements can easily be implemented in BGP without any need of extensions. The techniques enable weighted multipath load balancing in non-extended BGP using a mapping algorithm and an enforcer module. The mapping algorithm maps desired pre-defined weights for each next hop into partial prefix advertisements for each next hop that will result in the aggregate traffic ratios for each next hop converging to the predefined weights. The enforcer module modifies the routing behavior of the routers to make them align with the predefined link weights. The techniques can expand the capabilities of networks such as in data centers in terms of providing weighted multipath load balancing functionality using legacy switches which do not support BGP extensions. The techniques enable use of a wider range of switches to implement weighted multipath load balancing, thereby reducing costs.

Figure 9E:
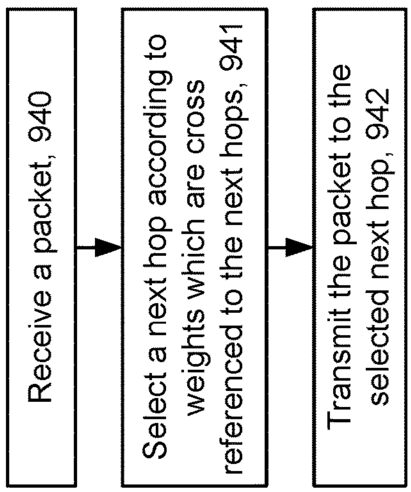
FIG. 9E depicts an example process at a router for routing packets using a routing table, consistent with FIG. 9D.
Figure 9D:
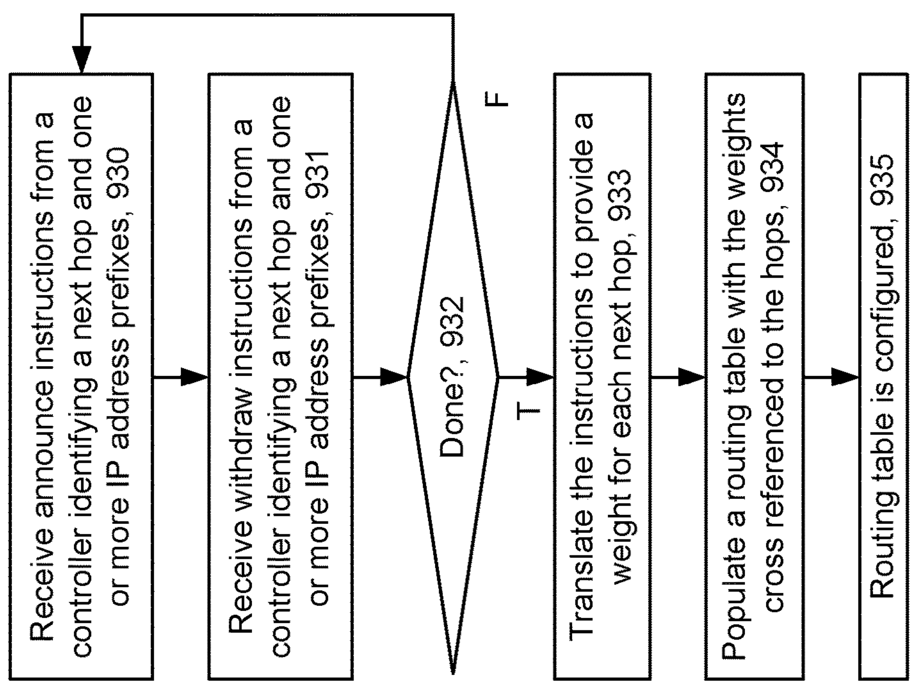
FIG. 9D depicts an example process at a router for configuring a routing table with fractional weights.

FIG. 9D depicts an example process at a router for configuring a routing table with fractional weights. In the embodiment of FIG. 9A-9C, the router receives the route updates via announce/withdraw messages and runs ECMP over the announced next hops to allow the next hops to selected according to different weights. In another possible approach, the router can translate the instructions back into fractional weights and run weighted ECMP for all prefixes. A router has access to all the information to make this translation. In this case, all next hops are available for each prefix. An example of the routing table in this case is as shown in FIG. 4B or 4D where the weights w1-w5 are cross referenced to the next hops.

The translation can be performed as follows. A table such as in FIG. 5C is provided using the announce and withdraw messages and the traffic estimates. Each row of the table cross references a probability that a next hop is selected to a traffic estimate. The probability is based on the number of next hops which can be selected for the prefix set of the row. The weight of each next hop is then the sum of the traffic estimate multiplied by the probability, for the corresponding column. For example, for next hop 1, the weight is $0.2\times0.5+0.3\times0.25+0.35\times0.2=0.1+0.075+0.07=0.245$.

Step 930 is the same as step 910 in FIG. 9B and includes receiving announce instructions from a controller identifying a next hop and one or more IP address prefix sets. Step 931 is the same as step 911 and includes receiving withdraw instructions from a controller identifying a next hop and one or more IP address prefix sets. A decision step 932 determines if there are no further announce and withdraw messages. If decision step 932 is false, steps 930 and 931 are repeated until all message are received. If decision step 932 is true, step 933 includes translating the instructions to provide a weight for each next hop. Step 934 includes populating a routing table with the weights cross referenced to the next hops, such as in FIG. 4B or 4D. The routing table is configured at step 935.

FIG. 9E depicts an example process at a router for routing packets using a routing table, consistent with FIG. 9D. In this process, the routing table has already been configured. Step 940 includes receiving a packet. Step 941 includes selecting a next hop according to the weights which are cross referenced to the next hops. Essentially, the probability that a next hop is selected is equal to its weight. Step 942 includes transmitting the packet to the selected next hop.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, numerous specific details are set forth in order to provide a thorough understanding. However, it will be clear to those of ordinary skill in the art that the embodiments may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a device, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A router, comprising:

a non-transitory memory storage comprising instructions and a routing table; and one or more processors in communication with the memory, wherein the one or more processors execute the instructions to:

receive a packet comprising an IP address prefix;

access the routing table, the routing table identifying a plurality of next hops connected to the router, the routing table comprising a plurality of rows, each row cross referencing an IP address prefix to a binary weight for each next hop of the plurality of next hops indicating whether the next hop is selected or unselected for use with the cross referenced IP address prefix;

identify a row of the plurality of rows comprising the IP address prefix of the packet;

based on binary weights in the row, identify next hops selected for the IP address prefix of the packet, the next hops selected for the IP address prefix of the packet comprising a subset of the plurality of next hops;

selecting a next hop of the subset as a selected next hop based on an equal cost multiple path process, wherein at least two next hops in the subset are selected with different aggregate weights over a time period which involves multiple next hop selections; and transmit the packet via the selected next hop.

2. The router of claim 1, wherein:

different subsets of the plurality of next hops are selected by binary weights in different rows of the routing table.

3. The router of claim 2, wherein:

the different subsets of the plurality of next hops comprise overlapping subsets and non-overlapping subsets.

4. The router of claim 2, wherein:

each different subset comprises at least two next hops for failure resiliency.

5. The router of claim 1, wherein the one or more processors execute the instructions to:

transmit packets from the router via the plurality of next hops according to weights which are assigned to the plurality of next hops, wherein the weight assigned to each next hop is based on: (a) a number of rows in the routing table which cross reference an IP address prefix set to a binary weight selecting the next hop and (b) associated traffic estimates.

6. The router of claim 1, wherein the one or more processors execute the instructions to:

transmit packets from the router via the plurality of next hops according to weights which are assigned to the plurality of next hops, wherein the weight assigned to each next hop is based on, for each row of the routing table which cross references an IP address prefix set to a binary weight selecting the next hop, a number of next hops selected by binary weights in the row and an associated traffic estimate.

7. The router of claim 1, wherein the one or more processors execute the instructions to:

for each next hop of the plurality of next hops, receive instructions from a controller identifying IP address prefix sets which will cross reference to the next hop; and populating the routing table based on the instructions.

8. The router of claim 7, wherein:

the instructions comprise an announce message in a Border Gateway Protocol.

9. The router of claim 7, wherein the one or more processors execute the instructions to:

for at least one next hop of the plurality of next hops, receive instructions from a controller identifying one or more IP address prefix sets which will not cross reference to the next hop.

10. The router of claim 9, wherein:

the instructions comprises a withdraw message in a Border Gateway Protocol.

11. The router of claim 1, wherein:

the instructions cause the router to provide weighted multipath load balancing using the equal cost multiple path process.

12. The router of claim 1, wherein:

for each next hop of the at least two next hops, the aggregate weight is based on a number of the rows in which the next hop is selected and a number of next hops which are selected in each row.

13. The router of claim 1, wherein:

in the row comprising the IP address prefix of the packet, at least one binary weight indicates that at least one next hop is unselected for use with the IP address prefix of the packet.

* * * * *